US012689231B2

(12) United States Patent
Ide

(10) Patent No.: US 12,689,231 B2
(45) Date of Patent: Jul. 21, 2026

(54) POWER TRANSMISSION APPARATUS FOR WIRELESSLY TRANSMITTING AC POWER SWITCHED AT A TIMING BASED ON A CORRECTED CLOCK SIGNAL, AND METHOD OF CONTROLLING SAME

(71) Applicant: CANON KABUSHIKI KAISHA, Tokyo (JP)

(72) Inventor: Takeshi Ide, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/606,483

(22) Filed: Mar. 15, 2024

(65) Prior Publication Data

US 2024/0223011 A1     Jul. 4, 2024

Related U.S. Application Data

(63) Continuation of application No. PCT/JP2022/033817, filed on Sep. 9, 2022.

(30) Foreign Application Priority Data

Sep. 17, 2021     (JP) ................................. 2021-151875

(51) Int. Cl.
*H02J 50/80*          (2016.01)
*H02J 50/10*          (2016.01)

(52) U.S. Cl.
CPC .............. *H02J 50/10* (2016.02); *H02J 50/80* (2016.02)

(58) Field of Classification Search
CPC ................................... H02J 50/10; H02J 50/80
See application file for complete search history.

(56) References Cited

U.S. PATENT DOCUMENTS

2015/0280443 A1* 10/2015 Vladan ................. H02J 50/402
                                                              307/104
2016/0064951 A1*  3/2016 Yamamoto .............. H02J 50/80
                                                              307/104

(Continued)

FOREIGN PATENT DOCUMENTS

JP          2018054847 A      4/2018
JP          2021072671 A      5/2021

(Continued)

*Primary Examiner* — Taelor Kim
(74) *Attorney, Agent, or Firm* — Canon U.S.A., Inc. IP Division

(57)          ABSTRACT

A power transmission unit 100 includes a clock generation circuit 105 that generates a clock signal, a switch circuit 102 that switches alternating-current power at a timing based on the clock signal, a power transmission antenna 101 that wirelessly transmits the switched alternating-current power, and a transmission antenna 103 that wirelessly transmits the clock signal. A power reception unit 200 includes a power reception antenna 201 that receives the power transmitted from the power transmission antenna, a reception antenna 203 that receives the clock signal transmitted from the transmission antenna, and a rectification circuit 202 that switches the power at a timing based on the received clock signal. A first correction circuit 106 corrects the phase of the clock signal to reduce a phase shift between a phase of the alternating-current power input from the rectification circuit and a phase of the clock signal input from the rectification circuit.

8 Claims, 6 Drawing Sheets

(56)        References Cited

U.S. PATENT DOCUMENTS

| | | | |
|---|---|---|---|
| 2016/0126753 A1* | 5/2016 | Wight | H02J 50/90 |
| | | | 307/104 |
| 2017/0271927 A1* | 9/2017 | Sakata | H02J 50/80 |
| 2018/0097407 A1* | 4/2018 | Oshima | H02M 7/06 |
| 2021/0126508 A1 | 4/2021 | Ide | |
| 2021/0281111 A1* | 9/2021 | Shoji | H02M 7/5387 |

FOREIGN PATENT DOCUMENTS

| | | |
|---|---|---|
| JP | 2021114835 A | 8/2021 |
| WO | 2015015771 W | 2/2015 |

\* cited by examiner

POWER TRANSMISSION APPARATUS FOR WIRELESSLY TRANSMITTING AC POWER SWITCHED AT A TIMING BASED ON A CORRECTED CLOCK SIGNAL, AND METHOD OF CONTROLLING SAME

CROSS-REFERENCE TO RELATED APPLICATIONS

This application is a Continuation of International Patent Application No. PCT/JP2022/033817, filed Sep. 9, 2022, which claims the benefit of Japanese Patent Application No. 2021-151875, filed Sep. 17, 2021, both of which are hereby incorporated by reference herein in their entireties.

BACKGROUND OF THE INVENTION

Field of the Invention

The present disclosure relates to a power transmission apparatus, a method of controlling the power transmission apparatus, a power reception apparatus, and a method of controlling the power reception apparatus.

Background Art

There is a system that supplies power to a motor to drive the motor. For example, in a semiconductor exposure apparatus, a fine movement stage for finely moving a wafer to form a pattern on the wafer and a motor for moving the fine movement stage are mounted on a coarse movement stage for moving the wafer to an exposure position. A power supply cable that supplies power to drive the motor is connected to the motor that is mounted on the coarse movement stage. Since the cable moves in conjunction with the movement of the coarse movement stage, tension of the cable affects the accuracy in positioning the stage. Thus, it has been examined to implement wireless power transmission for driving the motor.

It is necessary to apply an alternating-current voltage to the motor that moves the stage. This is because, for example, a positive voltage needs to be applied to move the stage in a positive direction on one axis, and a negative voltage needs to be applied to move the stage in a negative direction on the one axis. To move the fine movement stage, it is necessary to apply an alternating-current voltage to the motor mounted on the coarse movement stage.

Generally, the alternating-current voltage to be applied to the motor is generated by a circuit called a motor driver. By supplying a direct-current voltage and a control signal to the motor driver, the alternating-current voltage to be applied to the motor is generated. Patent Literature 1 describes a configuration of a motor wireless drive system in which a motor driver is arranged on a coarse movement stage and an alternating-current voltage is applied to a motor mounted on the coarse movement stage using wireless power transmission. The coarse movement stage is a power reception side of the wireless power transmission, and a power reception unit for the wireless power transmission is arranged on the coarse movement stage. A direct-current voltage is wirelessly transmitted to the power reception unit on the coarse movement stage and is applied to the motor driver on the coarse movement stage, whereby an alternating-current voltage to be applied to the motor mounted on the coarse movement stage is generated, and the motor is driven.

CITATION LIST

Patent Literature

Patent Literature 1: Japanese Patent Application Laid Open No. 2018-54847

However, since there arises the need for a space in which the motor driver is arranged on the power reception side of the wireless power transmission, the coarse movement stage increases in size. Hence, it is necessary to implement a large-scale control system for the coarse movement stage.

SUMMARY OF THE INVENTION

The present disclosure is directed to a control system that wirelessly transmits alternating-current power from a power transmission unit to a power reception unit and to a technique of enabling downsizing of the power reception unit.

According to an aspect of the present invention, a power transmission apparatus configured to wirelessly transmit alternating-current power to a power reception apparatus configured to be movable relative to the power transmission apparatus, includes a clock generation circuit configured to generate a clock signal, a correction circuit configured to correct a phase of the generated clock signal, a switch circuit configured to switch the alternating-current power at a timing based on the corrected clock signal, a power transmission antenna configured to wirelessly transmit the switched alternating-current power, and a transmission antenna configured to wirelessly transmit the clock signal, wherein the correction circuit is configured to vary an amount of correction of the phase of the generated clock signal between a case where a positional relationship between the power transmission apparatus and the power reception apparatus is a first positional relationship and a case where the positional relationship is a second positional relationship that is different from the first positional relationship.

Further features of the present invention will become apparent from the following description of exemplary embodiments with reference to the attached drawings.

DESCRIPTION OF THE EMBODIMENTS

Figure 1:
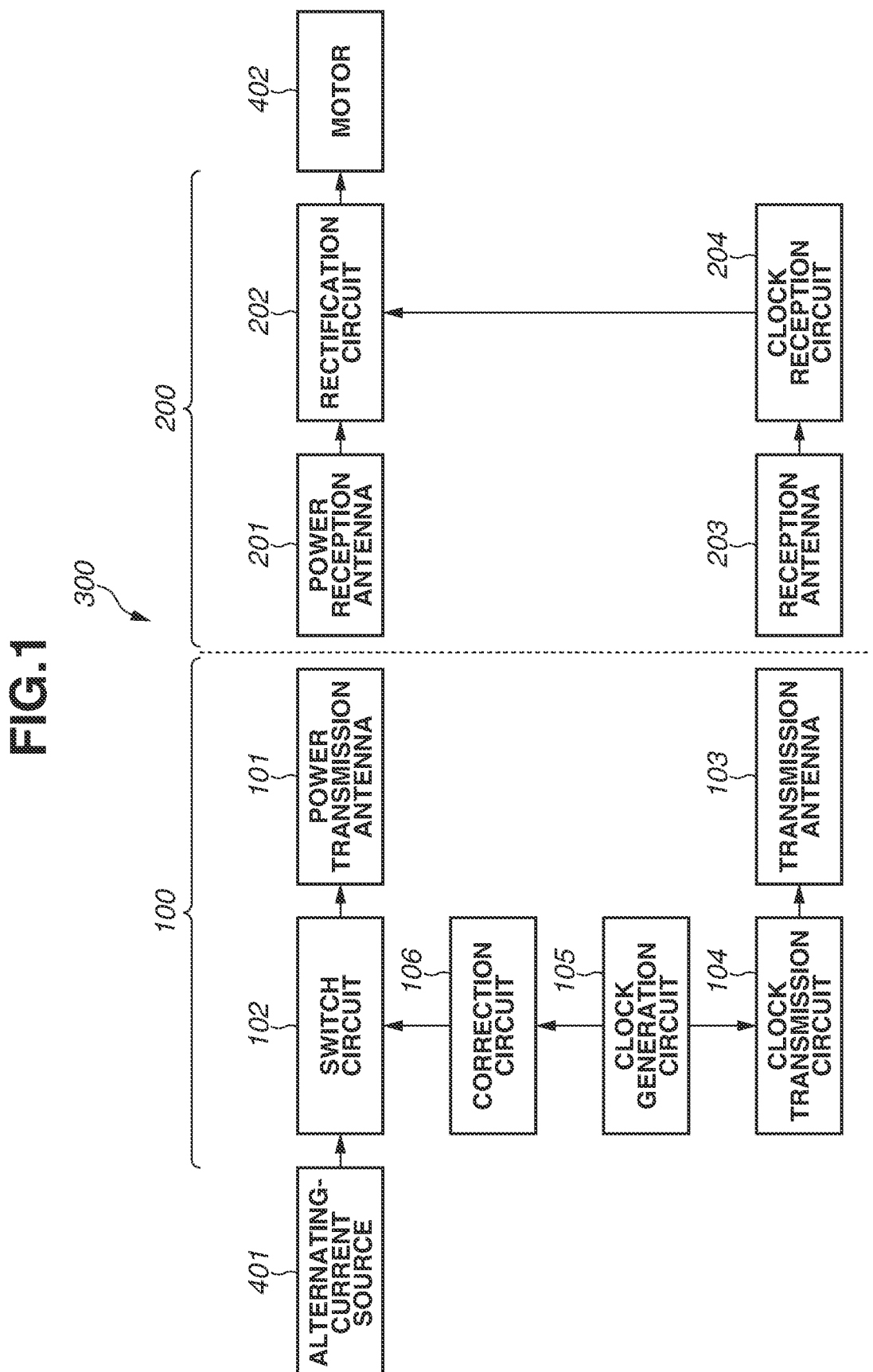
FIG. 1 is a block diagram illustrating a configuration example of a control system.

Exemplary embodiments will be described in detail below with reference to the drawings. Note that the following exemplary embodiments are not intended to limit the claims. While a plurality of features is described in the exemplary embodiments, not all combinations of these features are necessarily essential, and the plurality of features may be freely combined. In the drawings, identical or similar components are denoted by identical reference numerals, and a redundant description is omitted.

First Exemplary Embodiment

[System Configuration]

FIG. 1 is a block diagram illustrating a configuration example of a control system 300 according to a first exemplary embodiment. The control system 300 includes a power transmission unit (power transmission apparatus) 100, a power reception unit (power reception apparatus) 200, an alternating-current source 401, and a motor 402. The power transmission unit 100 and the power reception unit 200 are not physically connected to each other. Power is transmitted from a power transmission antenna 101 to a power reception antenna 201 in a non-contact manner, and a clock signal is transmitted from a transmission antenna 103 to a reception antenna 203 in a non-contact manner. The power transmission antenna 101 and the power reception antenna 201 are coupled to each other by magnetic field coupling. On the other hand, the transmission antenna 103 and the reception antenna 203 are coupled to each other by electric field coupling. A method of controlling the control system 300 is described below.

The power transmission unit 100 includes the power transmission antenna 101 and a switch circuit 102. The switch circuit 102 switches an alternating-current voltage supplied from the alternating-current source 401 at a frequency that is higher than a frequency of the alternating-current voltage supplied from the alternating-current source 401, and transmits the switched alternating-current voltage to the power transmission antenna 101. The power transmission antenna 101 wirelessly transmits power to the power reception antenna 201.

The switch circuit 102 includes, for example, a bidirectional switch for switching the supplied alternating-current voltage. The bidirectional switch is formed by connecting sources of two field-effect transistors (FETs) to each other and connecting gates of the two FETs to each other. Since body diodes of the two FETs are not turned on regardless of which of a positive voltage and a negative voltage is applied between drains of the two FETs, the switch circuit 102 is capable of switching the alternating-current voltage. By applying a voltage between the gates of the FETs and between the sources of the FETs, a voltage between the drains of the two FETs is switched to on or off.

The power transmission unit 100 also includes the transmission antenna 103, a clock transmission circuit 104, a clock generation circuit 105, and a correction circuit 106. The clock generation circuit 105 generates a clock signal, and transmits the clock signal to the transmission antenna 103 via the clock transmission circuit 104. In addition, the clock generation circuit 105 transmits the clock signal also to the correction circuit 106. The correction circuit 106 corrects a phase of the clock signal, transmits the corrected clock signal to the switch circuit 102, and controls a switching timing of the switch circuit 102. The transmission antenna 103 wirelessly transmits the clock signal to the reception antenna 203.

The power reception unit 200 includes the power reception antenna 201 and a rectification circuit 202. The power reception antenna 201 receives power emitted from the power transmission antenna 101, and supplies the received power to the rectification circuit 202. The rectification circuit 202 restores a waveform of the alternating-current voltage supplied from the power transmission antenna 101 into an original waveform of the alternating-current voltage in the alternating-current source 401, and supplies the restored alternating-current voltage to the motor 402. The motor 402 is driven based on the alternating-current voltage. The switch circuit 102, the power transmission antenna 101, the power reception antenna 201, and the rectification circuit 202 form a resonance circuit for efficiently wirelessly transmitting power.

The rectification circuit 202 includes a bidirectional switch, which is similar to that of the switch circuit 102, to output an alternating-current voltage. The switch circuit 102 and the rectification circuit 202 each using the bidirectional switch enable wireless power transmission of a desired alternating-current voltage to be applied to the motor 402. The power reception unit 200 also includes the reception antenna 203 and a clock reception circuit 204. The reception antenna 203 receives the clock signal emitted from the transmission antenna 103, and supplies the received clock signal to the clock reception circuit 204. The clock reception circuit 204 performs waveform shaping of the clock signal received by the reception antenna 203, transmits the clock signal subjected to the waveform shaping to the rectification circuit 202, and controls a switching timing of the rectification circuit 202.

Figure 2:
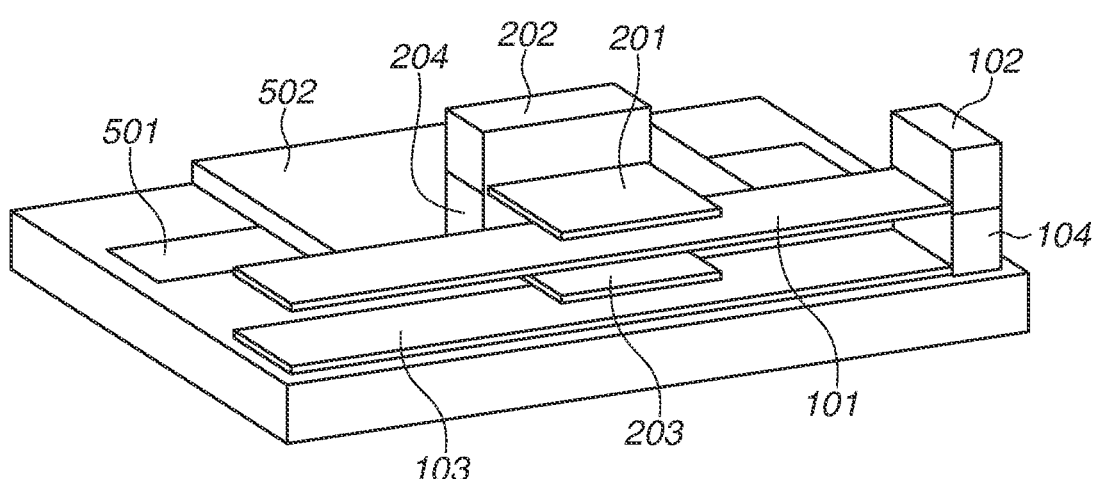
FIG. 2 is a view illustrating an outer appearance example of the control system.

FIG. 2 is a view illustrating an example of an outer appearance of the control system 300 according to the first exemplary embodiment. The power reception antenna 201 and the rectification circuit 202 are mounted on a stage 502 that slides on one axis by a linear motor 501. The power transmission antenna 101 is longer than the power reception antenna 201. The power reception antenna 201 moves relative to the power transmission antenna 101 in a longitudinal direction according to the movement of the stage 502. The power transmission antenna 101 and the power reception antenna 201 face each other in a non-contact manner at any position. This allows the power reception antenna 201 to wirelessly receive power from the power transmission antenna 101 regardless of the position of the stage 502.

Similarly, the reception antenna 203 and the clock reception circuit 204 are mounted on the stage 502. The transmission antenna 103 is longer than the reception antenna 203. The reception antenna 203 moves relative to the transmission antenna 103 in the longitudinal direction according to the movement of the stage 502. The transmission antenna 103 and the reception antenna 203 face each other in a non-contact manner at any position. This allows the power reception antenna 201 to wirelessly receive the clock signal from the transmission antenna 103 regardless of the position of the stage 502.

The correction circuit 106 changes the phase of the clock signal transmitted from the clock generation circuit 105, and thereafter transmits the clock signal to the switch circuit 102. An amount of change of the phase is an amount that cancels out a difference between the phase of power received by the power reception antenna 201 that is subjected to timing control with the clock signal transmitted to the switch circuit 102 and the phase of the clock signal transmitted to the rectification circuit 202.

For example, a positive voltage needs to be applied to the motor 402 to move the stage in a positive direction, and a negative voltage needs to be applied to the motor 402 to move the stage in a negative direction. In other words, the rectification circuit 202 is capable of controlling a movement direction of the stage by applying an alternating-current voltage to the motor 402.

In Patent Literature 1, the alternating-current voltage for controlling the movement direction of the motor 402 is generated in the power reception unit 200, and a direct-current voltage from a direct-current power source is applied to the power transmission unit 100. The direct-current voltage is supplied to the power reception unit 200 by wireless power transmission, and is supplied to the motor driver in the power reception unit 200. The motor driver then generates the alternating-current voltage to be applied to the motor to control the movement direction of the stage. The direct-current voltage is controlled to be a constant voltage to increase the accuracy of the alternating-current voltage to be applied to the motor.

In contrast, the control system 300 according to the present exemplary embodiment is different in configuration from Patent Literature 1 in that the power reception unit 200 includes no motor driver and has a smaller size. The alternating-current source 401 in the power transmission unit 100 corresponds to the motor driver in Patent Literature 1. The alternating-current voltage that is generated in the alternating-current source 401 and that is used for controlling the movement direction of the stage is applied to the power transmission unit 100. The alternating-current voltage from the alternating-current source 401 is then supplied to the power reception unit 200 by wireless power transmission via the switch circuit 102. The rectification circuit 202 restores the waveform of the alternating-current voltage in the power reception antenna 201 into the original waveform of the alternating-current voltage in the alternating-current source 401, and supplies the restored alternating-current voltage to the motor 402.

[Role of Correction Circuit]

In order for the rectification circuit 202 to restore the waveform of the alternating-current voltage into the original waveform of the alternating-current voltage with high accuracy, a switching timing of the rectification circuit 202 and a switching timing of the switch circuit 102 need to be synchronized with high accuracy. More specifically, it is only required to synchronize a zero-crossing timing of the waveform of power received by the rectification circuit 202 with the switching timing of the rectification circuit 202 with high accuracy. The zero-crossing timing is determined by the switching timing of the switch circuit 102. Naturally, if the timings are not synchronized, the waveform rectified by the rectification circuit 202 gets out of shape, and the amplitude of the waveform of the alternating-current voltage applied to the motor 402 is deviated from a desired value. If the amplitude is deviated, the operation of the motor 402 changes, whereby the position of the stage is shifted.

In this regard, to synchronize the above-mentioned switching timings with high accuracy, the correction circuit 106 corrects the phase of the clock signal that determines the switching timing of the switch circuit 102. The correction of the phase is described. The switch circuit 102 performs switching always at a constant timing based on the clock signal generated in the clock generation circuit 105. However, there is a case where the phase of the clock signal transmitted to the rectification circuit 202 via the transmission antenna 103 and the reception antenna 203 is changed by the movement of the stage 502.

Figure 3A:
FIG. 3A is a view illustrating a power transmission antenna.
Figure 3B:
FIG. 3B is a view illustrating a power transmission antenna.
Figure 3C:
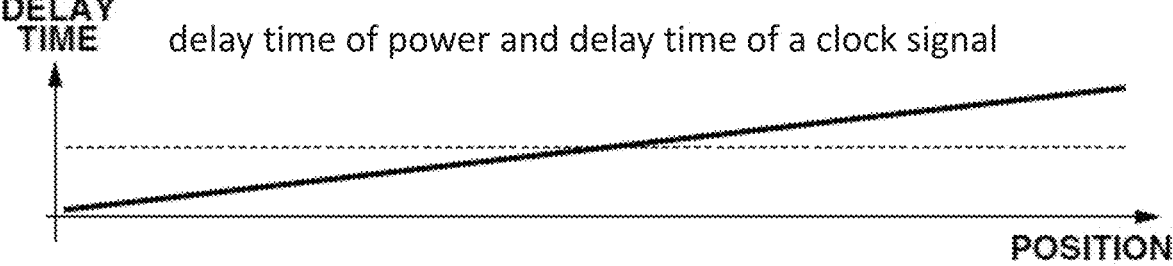
FIG. 3C is a chart indicating delay time of power and delay time of a clock signal.

FIGS. 3A to 3C are diagrams each illustrating a case where the phase of the clock signal is changed by the movement of the stage 502. FIG. 3A is a diagram illustrating a wiring example of the power transmission antenna 101.

The power transmission antenna 101 has a long shape obtained by stretching a spiral coil so that the power transmission antenna 101 and the power reception antenna 201 face each other in a non-contact manner at any position according to the movement of the stage 502. In this example of the power transmission antenna 101, an output node of the switch circuit 102 is connected to two end portions in the left in FIG. 3A, and power is supplied to the power transmission antenna 101 from the two end portions in the left.

FIG. 3B is a diagram illustrating a wiring example of the transmission antenna 103. The transmission antenna 103 has a long shape obtained by stretching an antenna pattern so that the transmission antenna 103 and the reception antenna 203 face each other in a non-contact manner at any position according to the movement of the stage 502. In this example of the transmission antenna 103, an output node of the clock transmission circuit 104 is connected to two end portions in the left in FIG. 3B, and power is supplied to the transmission antenna 103 from the two end portions in the left.

FIG. 3C illustrates delay time of power supplied to the power transmission antenna 101 and delay time of the clock signal supplied to the transmission antenna 103 with respect to respective positions in the longitudinal direction of the power transmission antenna 101 and the transmission antenna 103. A solid line indicates the delay time of the clock signal supplied to the transmission antenna 103 with respect to the position in the longitudinal direction of the transmission antenna 103. A broken line indicates the delay time of the power supplied to the power transmission antenna 101 with respect to the position in the longitudinal direction of the power transmission antenna 101.

Since a current supplied to the power transmission antenna 101, which is the spiral coil, moves to the right and left in FIG. 3A, the delay time does not monotonically increase with respect to the position. Thus, the phase of the power received by the power reception antenna 201 is determined by the phase of the clock signal in the power transmission unit 100 that controls the switching timing of the switch circuit 102, and does not change largely depending on the position. Hence, the delay time of the power to the power reception antenna 201 is approximately constant with respect to the position as indicated by the broken line in FIG. 3C.

In contrast, since a current supplied to the transmission antenna 103 propagates either to the right or left in FIG. 3B one-sidedly, delay time corresponding to time of propagation occurs at the right end of the transmission antenna 103. Thus, the phase of the clock signal received by the reception antenna 203 is more largely shifted from the phase of the clock signal received at the left end of the reception antenna 203, i.e., the phase of the clock signal in the power transmission unit 100, as the position approaches the right side. Hence, the delay time of the clock signal in the transmission antenna 103 becomes longer as the position of the transmission antenna 103 approaches the right side as indicated by the solid line in FIG. 3C.

Figure 4A:
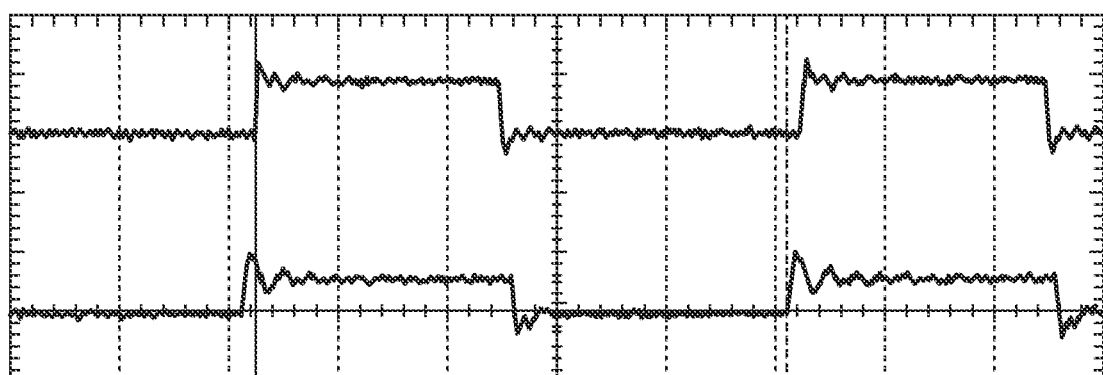
FIG. 4A is a chart illustrating measured waveforms of the clock signal.
Figure 4B:
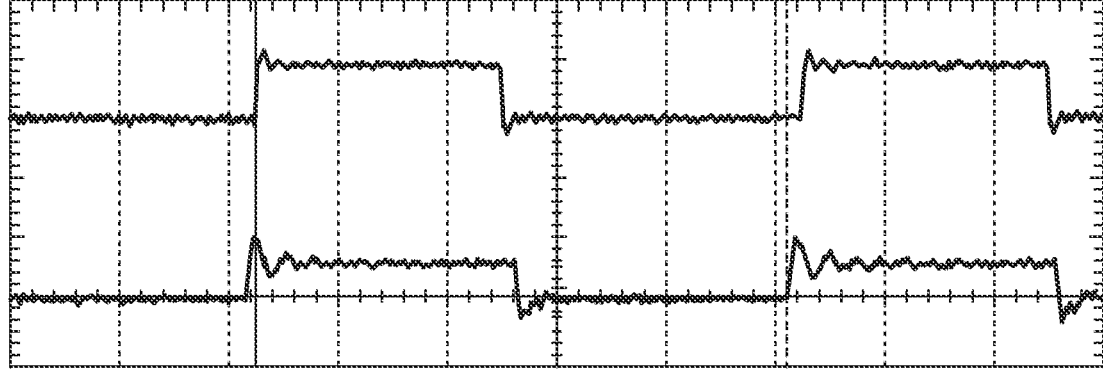
FIG. 4B is a chart illustrating measured waveforms of the clock signal.

FIGS. 4A and 4B are charts each illustrating measured waveforms of the clock signal. FIG. 4A illustrates measured waveforms of the clock signal in a case where the reception antenna 203 is located at the left end of the transmission antenna 103. FIG. 4B illustrates measured waveforms of the clock signal in a case where the reception antenna 203 is located 400 mm to the right of the left end of the transmission antenna 103.

The transmission antenna 103 has a length of 500 mm and the reception antenna 203 has a length of 100 mm. In each of FIGS. 4A and 4B, the upper waveform is a waveform of a transmission clock signal input to the transmission antenna 103, and the lower waveform is a waveform of a reception clock signal that is subjected to waveform shaping in the clock reception circuit 204.

In FIG. 4A, the reception clock signal is delayed by 244 ns with respect to the transmission clock signal. In contrast, in FIG. 4B, the reception clock signal is delayed by 246 ns with respect to the transmission clock signal. In other words, the delay time is increased by 2 ns corresponding to 400 mm, which is an increased amount of a distance of the position of the reception antenna 203 from the left end. Hence, the phase of the power received by the power reception antenna 201 and the phase of the clock signal received by the reception antenna 203 are shifted by 2 ns when the reception antenna 203 moves by 400 mm.

In this manner, the phase of the power received by the power reception antenna 201 and the phase of the clock signal received by the reception antenna 203 are shifted depending on the position of the stage 502 on which the power reception antenna 201 and the reception antenna 203 are mounted. The correction circuit 106 corrects this phase shift, and thereby reduces a difference between the zero-crossing timing of the waveform of the power input to the rectification circuit 202 and the timing of the rectification circuit 202 to switch the clock signal. This allows the rectification circuit 202 to restore the original waveform of the alternating-current voltage with high accuracy.

An amount of correction of the phase in the correction circuit 106 is an amount that cancels out the phase shift. Specifically, the correction circuit 106 shifts the phase by an amount equivalent to a shift amount of the clock signal input to the rectification circuit 202. More specifically, the correction circuit 106 generates a clock signal identical to the clock signal that is input to the rectification circuit 202 and whose phase is shifted, and outputs the clock signal to the switch circuit 102.

How to obtain the amount of correction made by the correction circuit 106 is described. The correction circuit 106 may estimate a phase shift amount based on a specified operation sequence of the stage 502 and obtain a phase correction amount. Further, the correction circuit 106 may preliminarily measure the phase shift amount based on the specified operation sequence and obtain the phase correction amount that cancels out the phase shift amount from a measured value. Alternatively, the correction circuit 106 may prepare table data indicating the position of the stage 502, the phase shift amount, and the phase correction amount, and acquire positional information of an operation of the stage 502 in real time to obtain the phase correction amount from the table data. Still alternatively, the control system 300 may observe the phase shift amount in real time and transmit a result of observation to the correction circuit 106 to obtain the phase correction amount.

As described above, the power transmission unit 100 wirelessly transmits the alternating-current power. The power reception unit 200 is capable of moving relative to the power transmission unit 100, and receives the alternating-current power wirelessly transmitted from the power transmission unit 100.

The clock generation circuit 105 generates the clock signal. The correction circuit 106 corrects the phase of the clock signal generated by the clock generation circuit 105, and transmits the corrected clock signal to the switch circuit 102. The switch circuit 102 switches the alternating-current power at a timing based on the clock signal. The power transmission antenna 101 wirelessly transmits the switched alternating-current power. The clock transmission circuit 104 wirelessly transmits the clock signal generated by the clock generation circuit 105 via the transmission antenna 103. The transmission antenna 103 wirelessly transmits the clock signal.

The power reception antenna 201 receives the alternating-current power wirelessly transmitted from the power transmission antenna 101. The reception antenna 203 receives the clock signal wirelessly transmitted from the transmission antenna 103. The clock reception circuit 204 wirelessly receives the clock signal via the reception antenna 203. The rectification circuit 202 switches the alternating-current power received by the power reception antenna 201 at a timing based on the received clock signal.

The correction circuit 106 corrects the phase of the clock signal to reduce a phase shift between the phase of the alternating-current power input to the rectification circuit 202 and the phase of the clock signal input to the rectification circuit 202.

For example, an amount of correction made by the correction circuit 106 is predetermined based on the specified operation sequence of the control system 300. Alternatively, the amount of correction made by the correction circuit 106 is determined based on the position of the power reception unit 200. Still alternatively, the amount of correction made by the correction circuit 106 is determined based on a relative positional relationship between the power transmission unit 100 and the power reception unit 200. Still alternatively, the amount of correction made by the correction circuit 106 is determined based on an amount of change in phase of the clock signal received by the reception antenna 203.

The switch circuit 102 and the rectification circuit 202 each perform switching using the bidirectional switch. One of the power transmission unit 100 and the power reception unit 200 is longer than the other thereof. The power reception unit 200 is capable of receiving the alternating-current power and receiving the clock signal even if its relative position with respect to the power transmission unit 100 changes.

According to the present exemplary embodiment, the control system 300 is a control system that applies the alternating-current voltage to the motor on the coarse movement stage using wireless power transmission, and the power reception unit 200 can be downsized.

Second Exemplary Embodiment

Figure 5:
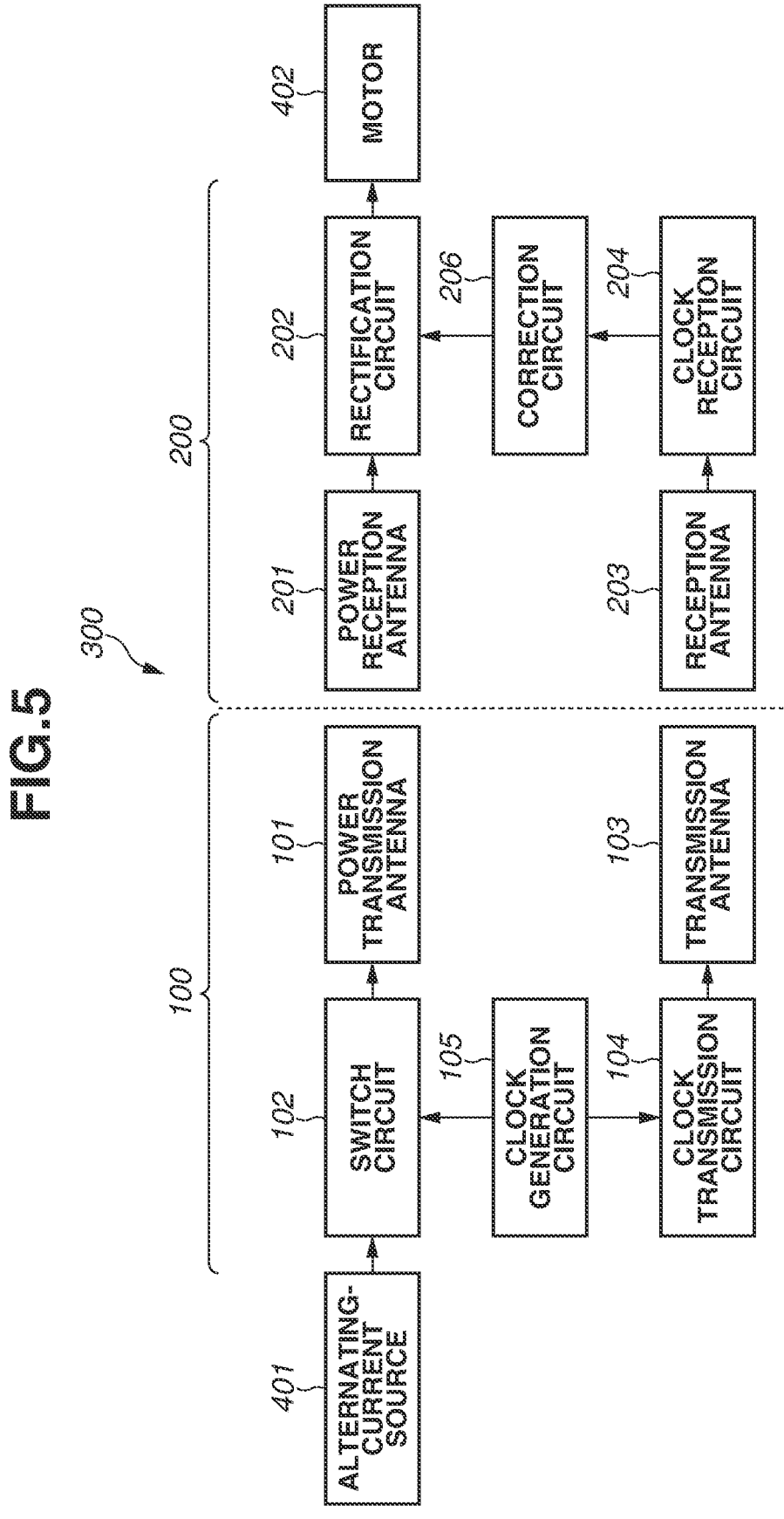
FIG. 5 is a block diagram illustrating a configuration example of a control system.

FIG. 5 is a diagram illustrating a configuration example of the control system 300 according to a second exemplary embodiment. In FIG. 5, the correction circuit 106 is deleted from and a correction circuit 206 is added to FIG. 1. A point where the second exemplary embodiment is different from the first exemplary embodiment will be described below.

The clock generation circuit 105 generates the clock signal, transmits the clock signal to the switch circuit 102, and controls the switching timing of the switch circuit 102.

The power reception unit 200 includes the reception antenna 203, the clock reception circuit 204, and the correction circuit 206. The clock reception circuit 204 performs waveform shaping of the clock signal received by the reception antenna 203, and outputs the clock signal subjected to the waveform shaping to the correction circuit 206. The correction circuit 206 corrects the phase of the clock signal input from the clock reception circuit 204, outputs the corrected clock signal to the rectification circuit 202, and controls the switching timing of the rectification circuit 202.

The correction circuit 206 corrects the above-mentioned phase shift between the phase of power input to the rectification circuit 202 and the phase of the clock signal received by the reception antenna 203. This can reduce a difference between the zero-crossing timing of the waveform of the power received by the rectification circuit 202 and the timing of the clock signal switched by the rectification circuit 202, and allows the rectification circuit 202 to restore the original waveform of the alternating-current voltage with high accuracy.

An amount of correction of the phase in the correction circuit 206 is an amount that cancels out the phase shift. Specifically, the correction circuit 206 cancels out the phase shift by shifting the phase of the clock signal in an opposite direction by an amount of the shift of the clock signal when the clock signal passes the transmission antenna 103 and the reception antenna 203 due to the factor described in the first exemplary embodiment. More specifically, the correction circuit 206 generates a clock signal identical to the clock signal transmitted from the clock generation circuit 105 to the switch circuit 102 and whose phase is not shifted, and outputs the clock signal to the rectification circuit 202. How to obtain the amount of correction is similar to that in the first exemplary embodiment.

In addition, since the correction circuit 206 is within the power reception unit 200, it may detect the phase from the waveform of power received by the power reception antenna 201 and correct the phase of the clock signal. The correction circuit 206 detects the phase of the alternating-current power input to the rectification circuit 202. The correction circuit 206 then corrects the phase of the clock signal input from the clock reception circuit 204 to reduce the phase shift between the phase of the alternating-current power input to the rectification circuit 202 and the phase of the clock signal input to the rectification circuit 202. This allows the correction circuit 206 to synchronize the zero-crossing timing of the waveform of power that is input to the rectification circuit 202 and that is determined by the switching timing of the switch circuit 102 with the timing of the rectification circuit 202 to switch the clock signal with higher accuracy.

In a case where the correction circuit 206 detects the phase from the waveform of the received power, the power reception antenna 201 needs to receive power in a sufficiently detectable amount. However, there may be a period in which the power reception antenna 201 receives only power that is too minute to detect. Examples of the period include a period in which the alternating-current voltage supplied from the alternating-current source 401 to the switch circuit 102 becomes a minute voltage when transitioning from a positive voltage to a negative voltage, and a period in which the alternating-current voltage becomes a minute voltage to apply the minute voltage to the motor 402. During this period, there is a case where the power received by the power reception antenna 201 becomes minute, and detection sensitivity becomes insufficient. In this case, a threshold may be set to detected power, and if the power does not satisfy the threshold, the correction circuit 206 may not correct the phase of the clock signal by detecting the phase of the power. This can prevent the correction circuit 206 from performing erroneous phase detection and erroneous phase correction when the detection sensitivity is insufficient.

Third Exemplary Embodiment

Figure 6:
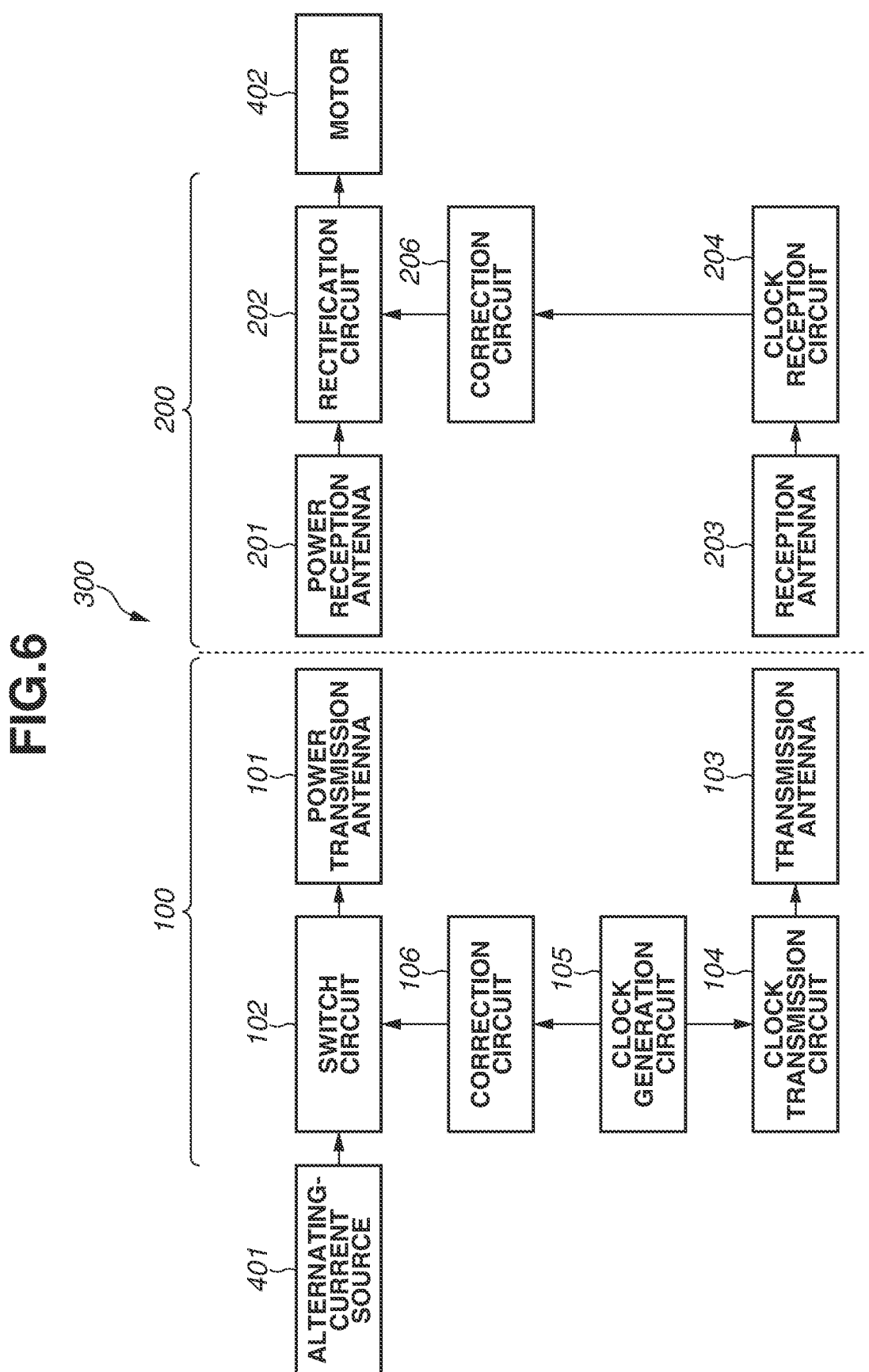
FIG. 6 is a block diagram illustrating a configuration example of a control system.

FIG. 6 is a diagram illustrating a configuration example of the control system 300 according to a third exemplary embodiment. In FIG. 6, the correction circuit 206 is added to FIG. 1. A point where the third exemplary embodiment is different from the first and second exemplary embodiments will be described below.

The power transmission unit 100 includes the correction circuit 106. The power reception unit 200 includes the correction circuit 206. The clock reception circuit 204 performs waveform shaping of the clock signal received by the reception antenna 203, and outputs the clock signal subjected to the waveform shaping to the correction circuit 206. The correction circuit 206 corrects the phase of the clock signal input from the clock reception circuit 204, outputs the corrected clock signal to the rectification circuit 202, and controls the switching timing of the rectification circuit 202. The respective roles of the correction circuits 106 and 206 according to the third exemplary embodiment are described.

Similarly to the second exemplary embodiment, the correction circuit 206 corrects the phase of the clock signal by an amount of the shift of the clock signal when the clock signal passes the transmission antenna 103 and the reception antenna 203. Furthermore, the correction circuit 206 may detect the phase from the waveform of power received by the power reception antenna 201 and correct the phase of the clock signal, similarly to the second exemplary embodiment.

The correction circuit 106 corrects the phase shift between the phase of the clock signal transmitted from the clock generation circuit 105 to the switch circuit 102 and the phase of the clock signal transmitted from the clock generation circuit 105 to the transmission antenna 103. There is a case where the phase of the clock signal transmitted from the clock generation circuit 105 to the transmission antenna 103 is shifted from the phase of the clock signal transmitted from the clock generation circuit 105 to the switch circuit 102 due to a delay occurring in the clock transmission circuit 104 or the like. The correction circuit 106 corrects this phase shift, and thereby further reduces a difference between the zero-crossing timing of the waveform of power input to the rectification circuit 202 and the timing of the rectification circuit 202 to switch the clock signal. This allows the rectification circuit 202 to restore the original waveform of the alternating-current voltage with higher accuracy.

In addition, a frequency of the clock signal in each of the switch circuit 102 and the rectification circuit 202 may be changed from a frequency of the clock signal generated by the clock generation circuit 105 using a phase locked loop (PLL) circuit or the like. In this case, the correction circuits 106 and 206 may correct a change in phase due to the operation of the stage 502 with respect to the clock signal before being input to the PLL circuit.

While the description has been given of the case where the power reception unit 200 slides on the one axis in the first to third exemplary embodiments, the same applies to a case where the power reception unit 200 sides on a biaxial plane, a case where the power reception unit 200 moves in a three-dimensional, freely-selected direction in which a distance at which the power transmission unit 100 and the power reception unit 200 faces also changes, a case where the power reception unit 200 rotationally moves, and other cases.

In addition, a power source voltage for operating the clock reception circuit 204 and the correction circuit 206 may be generated from a voltage applied to the motor 402 using a buck-boost circuit or the like. Furthermore, a power transmission antenna and a power reception antenna may be separately arranged for the power source voltage for operating the clock reception circuit 204 and the correction circuit 206.

The power transmission antenna 101 and the power reception antenna 201 may be formed of wiring on a printed circuit board. A magnetic sheet may be attached to the printed circuit board to reduce loss at the time of electromagnetic coupling and emission of electromagnetic noise. Each of the power transmission antenna 101 and the power reception antenna 201 may be a winding transformer using a magnetic body such as ferrite and a winding wire made of a litz wire.

In addition, the power transmission antenna 101 and the power reception antenna 201 may be coupled to each other using magnetic field coupling, optical coupling, sonic coupling, or the like by which the phase does not change largely depending on the position of the stage 502.

The present invention is not limited to the above-mentioned exemplary embodiments, and can be changed and modified in various manners without departing from the spirit and scope of the present invention. Thus, the claims are attached hereto to publicize the scope of the present invention.

According to the present disclosure, provided is a control system that wirelessly transmits alternating-current power from a power transmission unit to a power reception unit, and the power reception unit can be downsized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power transmission apparatus configured to wirelessly transmit alternating-current power to a power reception apparatus configured to be movable relative to the power transmission apparatus in a predetermined direction, the power transmission apparatus comprising:

an alternating-current source configured to output alternating-current power having a first frequency;

a clock generation circuit configured to generate a clock signal;

a clock transmission circuit configured to transmit the clock signal;

a correction circuit configured to correct a phase of the generated clock signal;

a switch circuit configured to be connected to the alternating-current source and including a bidirectional switch configured to switch the alternating-current power output from the alternating-current source at a second frequency which is higher than the first frequency at a timing based on the corrected clock signal;

a power transmission antenna stretched in the predetermined direction, connected to the switch circuit and configured to wirelessly transmit the alternating-current power having the second frequency and being output from the switch circuit to the power reception apparatus; and a transmission antenna stretched in the predetermined direction, connected to the clock transmission circuit and configured to wirelessly transmit the generated clock signal;

wherein the correction circuit is configured to vary an amount of correction of the phase of the generated clock signal using at least acquired positional information on a position at which the power reception apparatus is located relative to the power transmission apparatus in the predetermined direction.

2. The power transmission apparatus according to claim 1, wherein the amount of correction made by the correction circuit is predetermined based on a specified operation sequence of a control system including the power transmission apparatus and the power reception apparatus.

3. A method of controlling a power transmission apparatus configured to wirelessly transmit alternating-current power to a power reception apparatus configured to be movable relative to the power transmission apparatus in a predetermined direction, the method comprising:

outputting from an alternating-current source alternating-current power having a first frequency;

performing clock generation to generate a clock signal;

correcting a phase of the generated clock signal;

switching the alternating-current power output from the alternating-current source at a second frequency which is higher than the first frequency at a timing based on the corrected clock signal using a switch circuit connected to the alternating-current source and including a bidirectional switch;

wirelessly transmitting from a power transmission antenna stretched in the predetermined direction and connected to the switch circuit the alternating-current power having the second frequency and being output from the switch circuit to the power reception apparatus; and wirelessly transmitting the generated clock signal from a transmission antenna stretched in the predetermined direction and connected to a clock transmission circuit;

wherein in the correcting, an amount of correction of the phase of the generated clock signal is varied using at least acquired positional information on a position at which the power reception apparatus is located relative to the power transmission apparatus in the predetermined direction.

4. A wireless power transmission system comprising:

a power transmission apparatus and a power reception apparatus;

the power transmission apparatus comprising:

an alternating-current source configured to output alternating-current power having a first frequency;

a clock generation circuit configured to generate a clock signal;

a clock transmission circuit configured to transmit the clock signal;

a correction circuit configured to correct a phase of the generated clock signal;

a switch circuit configured to be connected to the alternating-current source and including a bidirectional switch configured to switch the alternating-current power output from the alternating-current source at a second frequency which is higher than the first frequency at a timing based on the corrected clock signal;

a power transmission antenna stretched in a predetermined direction, connected to the switch circuit and configured to wirelessly transmit the alternating-current power having the second frequency and being output from the switch circuit to the power reception apparatus; and a transmission antenna stretched in the predetermined direction, connected to the clock transmission circuit and configured to wirelessly transmit the generated clock signal; and the power reception apparatus comprising:

a power reception antenna of which a length in the predetermined direction is shorter than a length in the predetermined direction of the power transmission antenna;

a reception antenna of which a length in the predetermined direction is shorter than a length in the predetermined direction of the transmission antenna;

a power reception circuit configured to connect to the power reception antenna; and a reception circuit configured to connect to the reception antenna.

5. The wireless power transmission system according to claim 4, wherein the power reception apparatus further comprises a movement control unit configured to perform control on movement in the predetermined direction.

6. The wireless power transmission system according to claim 4, wherein the power transmission apparatus further comprises a positional information acquisition unit configured to acquire positional information on a position at which the power reception apparatus is located relative to the power transmission apparatus in the predetermined direction.

7. The wireless power transmission system according to claim 6, wherein the correction circuit is configured to vary an amount of correction of the phase of the generated clock signal using at least the acquired positional information.

8. The wireless power transmission system according to claim 4, wherein the power reception circuit includes the bidirectional switch.

*    *    *    *    *